United States Patent
Tang et al.

(10) Patent No.: US 9,868,102 B2
(45) Date of Patent: Jan. 16, 2018

(54) APPARATUS AND METHOD OF PREPARING ELECTRONIC INK MICROCAPSULES

(71) Applicant: BOE TECHNOLOGY GROUP CO., LTD., Beijing (CN)

(72) Inventors: Chen Tang, Beijing (CN); Jisheng Zhao, Beijing (CN); Lin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 168 days.

(21) Appl. No.: 14/351,726

(22) PCT Filed: Nov. 15, 2013

(86) PCT No.: PCT/CN2013/087252
§ 371 (c)(1),
(2) Date: Apr. 14, 2014

(87) PCT Pub. No.: WO2014/180113
PCT Pub. Date: Nov. 13, 2014

(65) Prior Publication Data
US 2014/0346696 A1 Nov. 27, 2014

(30) Foreign Application Priority Data
May 7, 2013 (CN) .......................... 2013 1 0163939

(51) Int. Cl.
*B01J 13/14* (2006.01)
*B01J 19/12* (2006.01)

(52) U.S. Cl.
CPC ............. *B01J 13/14* (2013.01); *B01J 19/123* (2013.01); *B01J 2219/1203* (2013.01)

(58) Field of Classification Search
CPC ........ A61K 49/225; A61K 8/11; B82Y 30/00; B82Y 5/00; B82Y 10/00; B82Y 20/00;
(Continued)

(56) References Cited

U.S. PATENT DOCUMENTS

| 5,741,554 A | * | 4/1998 | Tisone | ................... B01L 3/0265 427/424 |
| 2002/0050659 A1 | * | 5/2002 | Toreki | ................... A01N 25/006 264/4.1 |

(Continued)

FOREIGN PATENT DOCUMENTS

| CN | 102553502 A | 7/2012 |
| CN | 102381285 A | 9/2012 |
| CN | 103041757 A | 4/2013 |
| CN | 103246122 A | 8/2013 |

OTHER PUBLICATIONS

International Search Report dated Feb. 20, 2014; PCT/CN2013/087252

(Continued)

*Primary Examiner* — Jeffrey Washville
(74) *Attorney, Agent, or Firm* — Ladas & Parry LLP

(57) ABSTRACT

An apparatus and a method of preparing electronic ink microcapsules are disclosed. The apparatus of preparing electronic ink microcapsules includes: a first input tube, a second input tube, a UV light source, and an output tube connected to both the first input tube and the second input tube, respectively. The first input tube is a shading tube adapted to input an electrophoresis suspension comprising a mixture of a pre-polymer and a photo-initiator. The second input tube is adapted to input an aqueous solution comprising surfactant. The UV light source is adapted to radiate the mixed liquid in the output tube which is a mixture of the liquids input from the first input tube and the second input tube to prepare the electronic ink microcapsules. The electronic ink microcapsules prepared by using the apparatus and the method of preparing electronic ink microcapsules exhibit advantages including good uniformity, good thermal stability, etc.

17 Claims, 2 Drawing Sheets

(58) Field of Classification Search
CPC .............. B82Y 40/00; B01L 2200/027; B01L 2200/0647; B01L 2300/0867; B01L 2300/087; C09D 11/322; C09D 11/00; C09D 11/02
USPC ........ 428/402–402.24, 403, 404, 407, 321.1, 428/474.4; 427/424, 8, 421, 510, 331, 427/389.9, 212, 213–213.36, 483, 256; 264/11, 8, 15, 534, 5, 41, 4–4.7; 424/9.52, 725, 10.1, 76.2, 400, 408, 450, 424/451, 455, 93.7, 184.1, 497, 489, 501, 424/490, 491, 492, 493, 494, 495; 204/451, 453, 601, 604, 450; 436/52, 436/180; 422/101, 70, 99, 100
See application file for complete search history.

(56) References Cited

U.S. PATENT DOCUMENTS

| | | | |
|---|---|---|---|
| 2008/0246172 A1* | 10/2008 | Kawai | B01D 11/04 264/11 |
| 2011/0129941 A1* | 6/2011 | Kumacheva | A61K 9/1694 436/180 |
| 2012/0307345 A1 | 12/2012 | Hu | |

OTHER PUBLICATIONS

International Preliminary Report on patentability Appln. No. PCT/CN2013/087252; dated Nov. 10, 2015.
First Chinese Office Action Appln. No. 201310163939.5; dated Jan. 30, 2015.

* cited by examiner

APPARATUS AND METHOD OF PREPARING ELECTRONIC INK MICROCAPSULES

The embodiments of the present invention are directed to an apparatus and a method of preparing electronic ink microcapsules.

BACKGROUND

Electronic papers as display device have many advantages, such as, good flexibility, sharp color contrast, large visual angle, no need for backlight source, and the like. Nevertheless, electronic ink microcapsules, which are essential display units of the electronic paper, will cause a slow response in the electronic paper due to their poor dimensional uniformity. However, the outer diameters of the electronic ink microcapsules prepared in accordance with the current technique cannot achieve the target uniformity, and the capsule wall of the microcapsules exhibit poor thermal stability and sealing property, thereby resulting in problems of the electronic papers including delayed display, short service life, etc.

To address the aforesaid and additional problems, the embodiments of the present invention provide an apparatus and a method of preparing electronic ink microcapsules. The electronic ink microcapsules prepared by using the aforesaid apparatus and method exhibit good uniformity and good stability of capsule wall.

SUMMARY OF INVENTION

An embodiment of the present invention provides an apparatus of preparing electronic ink microcapsules comprising a first input tube, a second input tube, a UV light source, and an output tube connected to both the first input tube and the second input tube, respectively, wherein
the first input tube is a shading tube adapted to input an electrophoresis suspension comprising a mixture of a pre-polymer and a photo-initiator;
the second input tube is adapted to input an aqueous solution comprising a surfactant; and
the UV light source is adapted to radiate the mixed liquid in the output tube, which is a mixture of the liquids from the first input tube and the second input tube to prepare the electronic ink microcapsules.

Another embodiment of the present invention provides a method of preparing electronic ink microcapsules, comprising preparing electronic ink microcapsules by using the aforesaid apparatus of preparing electronic ink microcapsules

BRIEF DESCRIPTIONS OF DRAWINGS

Figure 3:
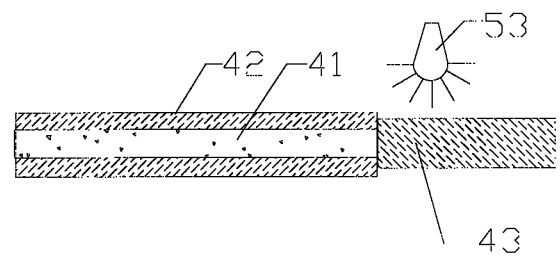

FIG. 3 a cross-sectional schematic view representing the structure of the apparatus of preparing electronic ink microcapsules in accordance with Example 5 of the present invention.

Figure 4:
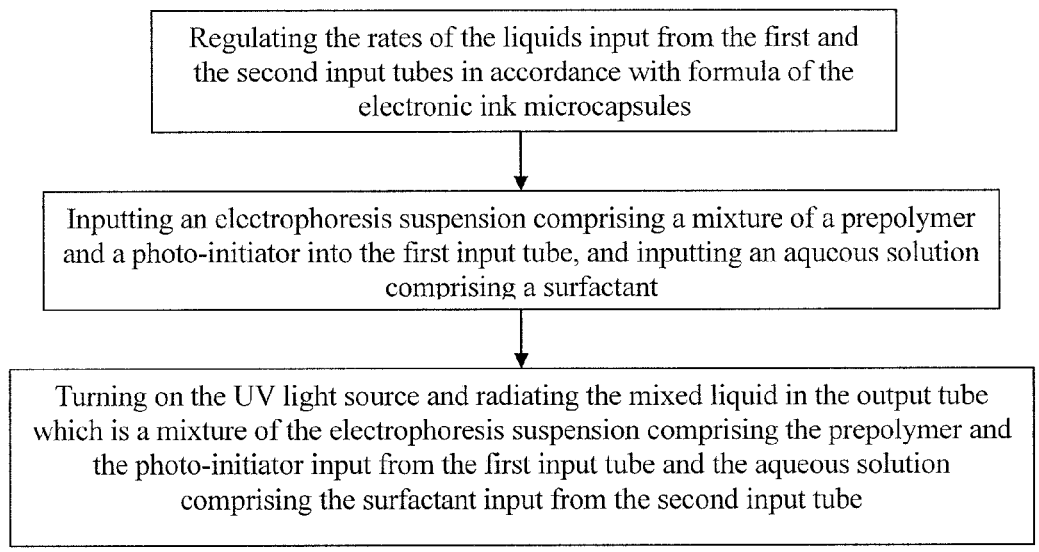

FIG. 4 is a flowchart representing the method of preparing electronic ink microcapsules in accordance with Example 6 of the present invention.

DETAILED DESCRIPTION OF INVENTION

Hereinafter the apparatus and method of preparing electronic ink microcapsules in accordance with the embodiments of the present invention are further described with reference to the accompany drawings and the examples.

The embodiment of the present invention provides an apparatus of preparing electronic ink microcapsules, comprising a first input tube, a second input tube, a UV light source and an output tube connected to both the first input tube and the second input tube, respectively, wherein
the first input tube is a shading tube adapted to input an electrophoresis suspension comprising a mixture of a pre-polymer and a photo-initiator;
the second input tube is adapted to input an aqueous solution comprising a surfactant; and
the UV light source is adapted to radiate the mixed liquid in the output tube, which is a mixture of the liquids from the first input tube and the second input tube to prepare the electronic ink microcapsules.

In one embodiment, the first input tube and the second input tube are detachably connected to the output tube, respectively.

In another embodiment, both the first input tube and the second input tube are provided with a flow regulating valve. In one aspect, the apparatus of preparing the electronic ink microcapsules further comprises a controller; the flow regulating valve is an electromagnetic valve; and the controller is adapted to control the flow regulation of the electromagnetic valve.

In yet another embodiment, the first input tube and the second input tube are connected to the output tube at the same site, thereby forming a manifold pathway port. In one aspect, the UV light source can be arranged at the site of the manifold pathway port. In another aspect, the manifold pathway port is a circular pathway port having a diameter of 0.8 to 300 μm.

In yet another embodiment, the apparatus of preparing the electronic ink microcapsules comprises at least two second input tubes located on the different sides of the first input tube. Alternatively, the first input tube and the second input tube are layered to form a bilayer tube structure.

Another embodiment of the present invention provides a method of preparing electronic ink microcapsules comprising preparing electronic ink microcapsules by using the aforesaid apparatus of preparing electronic ink microcapsules.

In one embodiment, the electrophoresis suspension comprising a mixture of a pre-polymer and a photo-initiator input from the first input tube to the output tube has a rate of 4 to 20 ml/h; and the aqueous solution comprising a surfactant input from the second input tube to the output tube has a rate of 0.5 to 2 ml/h.

For instance, the electrophoresis suspension comprising a mixture of a pre-polymer and a photo-initiator input from the first input tube to the output tube has a rate of 4 to 10 ml/h, and the aqueous solution comprising a surfactant input from the second input tube to the output tube has a rate of 0.5 to 1 ml/h.

In another embodiment, the mixed liquid in the output tube which is a mixture of the liquids input from the first input tube and the second input tube are radiated with a light from the UV light source for a time of from 5 to 500 ms.

For instance, the mixed liquid in the output tube which is a mixture of the liquids input from the first input tube and the second input tube are radiated with a light from the UV light source for a time of from 5 to 20 ms.

The apparatus and the method of preparing electronic ink microcapsules in accordance with the embodiments of the present invention can achieve the following benefits.

First, the apparatus and method of the electronic ink microcapsules in accordance with the embodiments of the present invention can control the diameters of the electronic ink microcapsules by precisely controlling the flow of the liquid input from the input tube, thereby preparing electronic ink microcapsules having good uniformity of outer diameters, so that the slow response problem caused by the non-uniform capsule diameters can be avoided when producing an electronic paper.

Second, the apparatus and method of preparing the electronic ink microcapsules in accordance with the embodiments of the present invention allow the electrophoresis suspension comprising a pre-polymer and a photo-initiator to be sufficiently mixed with the aqueous solution comprising a surfactant by precisely controlling the flow of the liquid input from the input tube, thereby forming capsule walls having uniform thickness and achieving good thermal stability and sealing property.

Third, the apparatus of preparing electronic ink microcapsules in accordance with the embodiments of the present invention has simple structure, is convenient to be controlled, further simplifies the preparation process, and improve the quality and properties of the produced electronic ink microcapsules.

The following examples are provided for the purpose of illustrating the present invention, instead of limiting the scope of the present invention.

EXAMPLE 1

The apparatus of preparing electronic ink microcapsules of this example comprises a first input tube, a second input tube, a UV light source, and an output tube connected to both the first input tube and the second input tube, respectively, wherein
the first input tube is a shading tube adapted to input an electrophoresis suspension comprising a mixture of a pre-polymer and a photo-initiator;
the second input tube is adapted to input an aqueous solution comprising a surfactant; and
the UV light source is adapted to radiate the mixed liquid in the output tube which is a mixture of the liquids input from the first input tube and the second input tube to prepare the electronic ink microcapsules.

The output tube receives and mixes liquids input from the first input tube and the second input tube, and then the mixed liquid is subject to UV radiation to form the electronic ink microcapsules. For convenience of UV radiation, the output tube may be set to transparent tube, such as, transparent glass tube, transparent plastic tube, and the like.

Among others, the electrophoresis suspension is not compatible with the aqueous solution after mixing. After mixing, the pre-polymer and the photo-initiator undergo photo-polymerization under the radiation of UV light source, and encapsulate the electrophoresis suspension to produce electronic ink microcapsules. The first input tube is set to shading tube to prevent the earlier reaction of the photo-initiator caused by the light radiation.

By using the apparatus of preparing electronic ink microcapsules of this example, when preparing the electronic ink microcapsules, the diameters and the generation rate of the electronic ink microcapsules can be conveniently controlled by controlling the flow of the liquids input from the first input tube and the second input tube and the concentration of surfactant, and by selecting an appropriate diameter of the output tube in accordance with the desired diameters of the electronic ink microcapsules.

The controlling can be controlling directly the rate and flow of the liquids input from the first input tube and the second input tube, or controlling the rate of the input liquids via the flow regulation valve arranged on the input tube. By using the apparatus of preparing electronic ink microcapsules of this example, the produced electronic ink microcapsules have the following advantages: small size deviation, good uniformity, uniform and medium wall thickness of capsules, and good stability.

EXAMPLE 2

The apparatus of preparing electronic ink microcapsules of this example is further improved on the basis of Example 1 as follows.

Further, the first input tube and the second input tube are detachably connected to the output tube, respectively. Such detachable connection between the first input tube or the second input tube and the output tube facilitates controlling the diameters of the electronic ink microcapsules by using the first input tube, the second input tube, and the output tube having different diameters, thereby facilitating controlling the production of electronic ink microcapsules.

The particular structure of the detachable connection can be threaded connection, screw fastening connection, clip-hook connection, etc., as long as the liquid sealing can be ensured when connecting.

EXAMPLE 3

Figure 1:
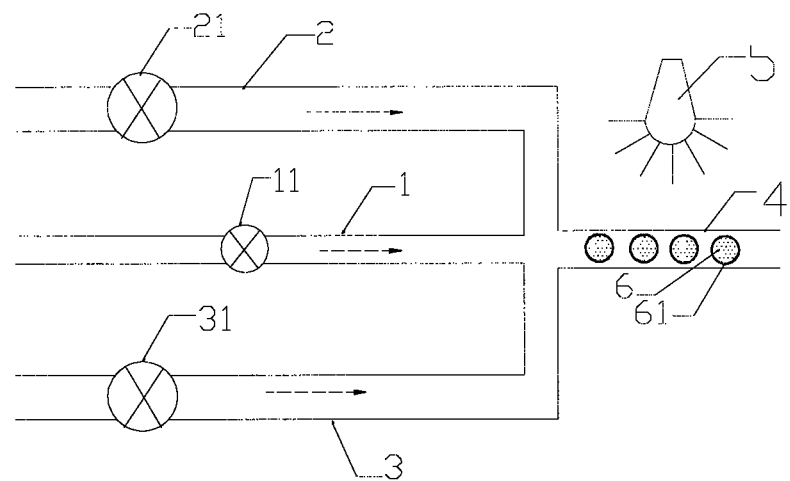
FIG. 1 is a schematic view representing the structure of the apparatus of preparing electronic ink microcapsules in accordance with Example 3 of the present invention.

As shown in FIG. 1, the apparatus of preparing electronic ink microcapsules of this example comprises a first input tube 1, two second input tubes (that is, the second input tube 2, and the second input tube 3), a UV light source 5, and an output tube 4 connected to the first input tube 1 and the second input tubes 2, 3, respectively.

The first input tube 1 is a shading tube adapted to input a electrophoresis suspension comprising a mixture of a pre-polymer and a photo-initiator. The second input tubes 2, 3 are adapted to input an aqueous solution comprising a surfactant. The UV light source 5 is adapted to radiate the mixed liquid in the output tube which is a mixture of the liquids input from the first input tube 1 and the second input tubes 2,3, thereby producing the electronic ink microcapsules 6. The electronic ink microcapsules 6 comprise capsule wall 61 located in the outer layer, which is represented by the black layer at the periphery of the electronic ink microcapsules 6 in the drawings.

The first input tube 1 is provided with a flow regulating valve 11, the second input tube 2 is provided with a flow regulating valve 21, and the second input tube 3 is provided with a flow regulating valve 31. The flow regulation valve can be mechanical valve, manual valve, etc.

Through the setting of the flow regulating valve, the electronic ink microcapsules of this example can achieve conveniently the control of the rate and flow of the liquids from the respective input tubes, thereby providing advantages including good uniformity and stability, as well as ease and precision of control.

As a further modification of this example, the apparatus of preparing electronic ink microcapsules of this example further comprises a controller; and the flow regulating valve is an electromagnetic valve.

The controller controls electromagnetically the flow regulation of electromagnetic valve. The arrangement of controller and electromagnetic valve enables the apparatus to auto-control the flow and the rate of the liquids in the input tubes. Meanwhile, the electromagnetic control is a wireless control which avoids the requirement of installing a circuit, thereby providing advantages including simple structure, ease of control, etc.

In this example, there are at least two second input tubes, and the second input tube 2 and the second input tube 3 are arranged at different sides of the first input tube 1, respectively, so as to ensure the sufficient mixing of the electrophoresis suspension comprising the mixture of the prepolymer and the photo-initiator and the aqueous solution comprising the surfactant, thereby facilitating the formation of electronic ink microcapsules.

EXAMPLE 4

Figure 2:
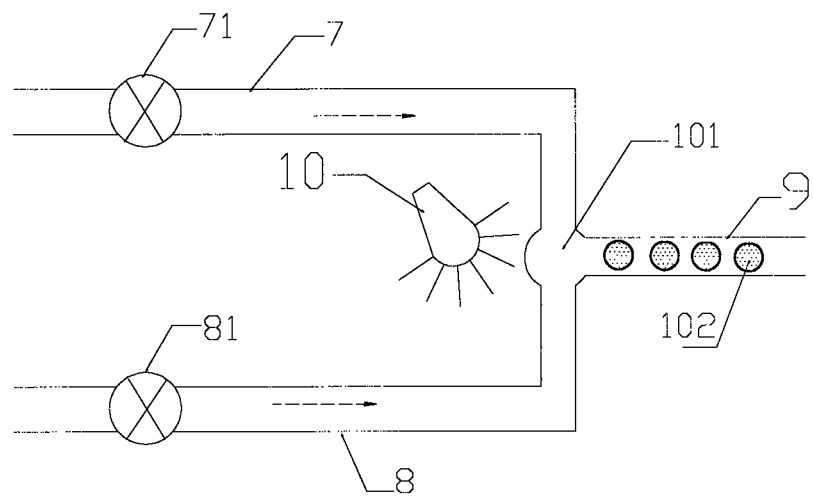
FIG. 2 is a schematic view representing the structure of the apparatus of preparing electronic ink microcapsules in accordance with Example 4 of the present invention.

As shown in FIG. 2, the apparatus of preparing electronic ink microcapsules of this example comprises a first input tube 7, a second input tube 8, a UV light source 10, and an output tube 9 connected to the first input tube 7 and the second input tube, respectively.

The first input tube 8 is a shading tube, and adapted to input the electrophoresis suspension comprising the mixture of the prepolymer and the photo-initiator.

The second input tube 9 is adapted to input the aqueous solution comprising the surfactant.

The first input tube 7 and the second input tube 8 connect to the output tube 9 at the same site to form a manifold pathway port 101.

The UV light source is adapted to radiate the mixed liquid in the output tube, which is a mixture of the liquids input from the first input tube and the second input tube, to produce electronic ink microcapsules 102.

The arrangement of the first input tube 7 and the second input tube 8 connected to the output tube 9 at the same site of the output tube 9 avoids the requirement of preventing the electrophoresis suspension comprising the mixture of the prepolymer and the photo-initiator from exposing to light source before mixing with the aqueous solution comprising the surfactant or the requirement of installing a shading layer or cover, and thus further simplify the structure and ensure the activity of the photo-initiator, thereby facilitating the production of the electronic ink microcapsules.

As a further modification of this example, the UV light source 10 is positioned at the site of the manifold pathway port 101. The manifold pathway port 101 serves as a portion of the output tube 9, where the liquid is a mixture of the liquid input from the first input tube and the liquid input from the second input tube, thereby arranging the UV light source 10 at the site of the manifold pathway port 101f radiation.

The manifold pathway port 101 is a circular pathway port having a diameter ranging from 0.8 to 300 μm. During the specific process, the inner diameter of the circular pathway port is associated with the diameters of the produced electronic ink microcapsules, and may vary in accordance with requirements. In this example, the inner diameter is preferably in the range of from 0.8 to 300 more preferably from 1 to 50 μm (e.g., 25 μm), and further preferably from 1 to 20 μm.

EXAMPLE 5

As shown in FIG. 3, the apparatus of preparing electronic ink microcapsules of this example comprises a first input tube 41, a second input tube 42, a UV light source 53, and an output tube 43 connected to the first input tube 41 and the second input tube 42, respectively.

The first input tube 41 is a shading tube, and adapted to input an electrophoresis suspension comprising a mixture of a prepolymer and a photo-initiator.

The second input tube 42 is adapted to input the aqueous solution comprising the surfactant.

The UV light source 53 is adapted to radiate the mixed liquid in the output tube, which is a mixture of the liquids from the first input tube and the second input tube to prepare the electronic ink microcapsules.

Among others, the first input tube 41 and the second input tube 42 is arranged in a layered relation to form a bilayer tube structure.

It can be seen from FIG. 3 that the second input tube 42 is arranged outside the first input tube 41; and the tube wall of the first input tube 41 separates the liquid located between the second input tube 42 and the first input tube 41, until the liquids in the first input tube 41 and the second input tube 42 enter into the output tube 43 and mix. After mixing, the mixture is radiated with the UV light source 53, thereby producing the electronic ink microcapsules. In comparison with the structure of any of the before-described examples, this structure provides an embodiment of layered tube.

During the specific process, it is an alternative embodiment that the first input tube is arranged outside the second input tube to form a bilayer tube structure. Moreover, as a further modification of this example, the layered tube structure formed by the first input tube and the second input tube is preferably a co-axial layered tube. The layered tube structure is easy and convenient for installation.

It can be seen from the combination of Examples 1 to 5 that the apparatus of preparing electronic ink microcapsules in accordance with the embodiments of the present invention can produce electronic ink microcapsules exhibiting uniform dimension profile, good stability of capsule wall, and good sealing properties. Meanwhile, the apparatus per se have the advantages including simple structure, ease of realization, as well as ease and precision of control, etc.

EXAMPLE 6

The example is directed to a method of preparing electronic ink microcapsules, wherein the apparatus of preparing electronic ink microcapsules in accordance with any of Examples 1 to 5 is used to produce electronic ink microcapsules.

As shown in FIG. 4, the method comprises the following steps:

Step 1: regulating the rate of the liquids in the first input tube and a second input tube, respectively, in accordance with the formula of the electronic ink microcapsules;

Steps 2: inputting an electrophoresis suspension comprising a mixture of a prepolymer and a photo-initiator into the first input tube, and inputting an aqueous solution comprising a surfactant into the second input tube; and Step 3: turning on the UV light source and radiating the mixed liquid in the output tube, which is a mixture of the liquids from the first input tube and the second input tube to prepare the electronic ink microcapsules.

The electrophoresis suspension comprises electrophoresis particles, a dye, adjuvants, and PTFE.

The prepolymer is preferably polymerizable monomers, such as, one or more selected from the group consisting of methylacyloxypropyldimethylchlorosilane (DMS-R11), pentaerythritol triacrylate (PETA-3), trihydroxymethylpropane triacrylate (TMPTA), pentaerythritol tetraacrylate (PETTA), dipropylene diacrylate (DPGDA), tripropylene diacrylate (TPGDA), hexanediol diacrylate (HDDA), neopentyl glycol diacrylate (NPGDA), hydroxyethyl methacrylate (HEMA), hydroxypropyl methacrylate (HPMA), and the like. The mass percentage of the prepolymer can be 5-50%, preferably 10-20%.

Among other, the photo-initiator can be one or more selected from the group consisting of 1-hydroxycyclohexylphenylketone (HCPK), 2-hydroxy-2-methyl-1-phenyl-1-acetone (HMPP), 2-methyl-1-(4-methylthiophenyl)-2-morpholin-1-acetone (MMMP), and 2,2-diethoxyacephenone (DEAP). The mass percentage of the photo-initiator can be 1%-10%, preferably 2%-5%.

The surfactant can be selected from the group consisting of: sodium lauryl sulfate, sodium lauryl sulfonate, stearyltrimethylammonium bromide, and the like. The mass percentage of the surfactant can be 1-10%, preferably 1-5%.

The method of preparing electronic ink microcapsules of this example utilizes the apparatus of preparing electronic ink microcapsules in accordance with the embodiment of the present application, so that the produced electronic ink microcapsules have the advantages including uniform appearance dimension, uniform medium capsule wall thickness, and superior thermal stability and sealing property, thereby producing electronic papers having long service life and short response time.

EXAMPLE 7

This example is a further modification of Example 6. In Step 1, the rate of the liquid input from the first input tube to the output tube is set as 4 to 20 ml/h; and the rate of the liquid input from the second input tube to the output tube is set as 0.5 to 2 ml/h.

In particular, 1 wt % aqueous solution of sodium lauryl sulfonate is input from the second input tube into the output tube at a rate of 4 ml/h; and a mixed liquid comprising 2 wt % of 1-hydroxycyclohexylphenylketone, 19 wt % of methylacyloxypropyldimethylchlorosilane, and 80 wt % of electrophoresis suspension is input from the first input tube to the output tube at a rate of 0.5 ml/h. The liquids input from the first input tube and the second input tube are mixed in the output tube, and then radiated with the UV light emitted from the UV light source for a time of 35 ms for polymerization, thereby producing the electronic ink microcapsules.

If there are a plurality of first input tubes and second input tubes, the rate is the overall rate of all the liquids input from the first input tubes or from the second input tubes into the output tube.

EXAMPLE 8

This example is a further modification of Example 7, wherein the rate of the liquid input from the first input tube to the output tube is 4 to 10 ml/h; and the rate of the liquid input from the second input tube to the output tube is 0.5 to 1 ml/h.

In particular, 1.5 wt % aqueous solution of stearyltrimethylammonium bromide is input from the second input tube into the output tube at a rate of 4 ml/h; and a mixed liquid comprising 3 wt % of 2-hydroxy-2methyl-1-phenyl-1-acetone, 15 wt % of hexanediol diacrylate, and 82 wt % of electrophoresis suspension is input from the first input tube into the output tube at a rate of 0.8 ml/h. The aforesaid liquids are mixed in the output tube or at the site of manifold pathway port, and radiated with UV light emitted from the UV light source, thereby producing the electronic ink microcapsules.

The rates of the liquids input from the first or the second input tube to the output tube as used in this examples facilitate the uniformity, thermal stability, and sealing properties in comparison with the previous example.\

EXAMPLE 9

The method of preparing electronic ink microcapsules of this example is a further modification of Examples 6 to 8, wherein:

During the radiation of the mixed liquid in output tube with the UV light source, the liquids input from the first input tube and the second input tube is mixed for a time ranging from 5 to 500 ms. The specific time as used can be controlled through the corporation of the length of the output tube and the rate of liquid. The specific process comprises keeping the UV light source as "turned on", allowing the mixture of the liquids from the first input tube and the second input tube to be output from the output tube at a time of 5 to 500 ms after mixing, preferably 5 to 20 ms.

As compared with the aforesaid examples, the method of preparing electronic ink microcapsules of this example provides a time of UV radiation, and further defines the specific process parameters, thereby facilitating the production of electronic ink microcapsules having superior qualities and performances.

To sum up, the apparatus and method of preparing electronic ink microcapsules in accordance with the embodiments of the present invention can produce electronic ink microcapsules having stable structure and good performances, thereby facilitating extending the service life and shorten the response delay of electronic papers. Moreover, the apparatus per se has advantages including simple structure, ease of handle, and precision of control. The method uses the apparatus in accordance with the embodiments of the present invention to produce electronic ink microcapsules, and have advantages including ease of realization.

The aforesaid embodiments are only for the purpose of illustrating the present invention, rather than limiting the scope of the present invention. Persons of ordinary skill in the relevant filed can make various modifications and changes without depart the sprit and scope of the present invention. All the equivalences are encompassed within the present invention, and the scope of the present invention is defined by the accompanied claims.

We claim:
1. An apparatus of preparing electronic ink microcapsules, comprising a first input tube, a second input tube, a UV light source, and an output tube connected to both the first input tube and the second input tube, respectively, wherein:
   the first input tube is a shading tube adapted to input an electrophoretic suspension comprising a mixture of a pre-polymer and a photo-initiator;
   the second input tube is adapted to input an aqueous solution comprising a surfactant; and
   the UV light source is adapted to radiate the mixed liquid in the output tube, which is a mixture of the liquids from the first input tube and the second input tube to prepare the electronic ink microcapsules,
   wherein the first input tube and the second input tube are connected to the output tube at the same site, thereby forming a manifold pathway port at the confluent site, the manifold pathway port has an arc having a diameter of 0.8 to 300 μm at a site opposite to the output tube in a plane through the first input tube, the second input tube and the output tube, and the tube sizes of the first input tube and the second input tube are less than the diameter of the arc.

2. The apparatus of preparing electronic ink microcapsules in accordance with claim 1, wherein the first input tube and the second input tube are detachably connected to the output tube, respectively.

3. The apparatus of preparing electronic ink microcapsules in accordance with claim 2, wherein both the first input tube and the second input tube are provided with a flow regulating valve.

4. The apparatus of preparing electronic ink microcapsules in accordance with claim 3, further comprising a controller, wherein the flow regulating valve is an electromagnetic valve, and the controller is adapted to control the flow regulation of the electromagnetic valve.

5. The apparatus of preparing electronic ink microcapsules in accordance with claim 1, wherein the UV light source is arranged at the site of the manifold pathway port.

6. The apparatus of preparing electronic ink microcapsules in accordance with claim 1, comprising at least two second input tubes located on the different sides of the first input tube.

7. The apparatus of preparing electronic ink microcapsules in accordance with claim 1, wherein the first input tube and the second input tube are layered to form a bilayer tube structure.

8. A method of preparing electronic ink microcapsules comprising preparing the electronic ink microcapsules by using the apparatus of preparing electronic ink microcapsules in accordance with claim 1.

9. The method of preparing electronic ink microcapsules in accordance with claim 8, wherein an electrophoretic suspension comprising a mixture of a pre-polymer and a photo-initiator which is input from the first input tube into the output tube has a rate of 4 to 20 ml/h; and an aqueous solution comprising a surfactant which is input from the second input tube into the output tube has a rate of 0.5 to 2 ml/h.

10. The method of preparing electronic ink microcapsules in accordance with claim 9, wherein an electrophoretic suspension comprising a mixture of a pre-polymer and a photo-initiator which is input from the first input tube into the output tube has a rate of 4 to 10 ml/h; and an aqueous solution comprising a surfactant which is input from the second input tube into the output tube has a rate of 0.5 to 1 ml/h.

11. The method of preparing electronic ink microcapsules in accordance with claim 8, wherein a liquid in the output tube which are a mixture of liquids input from the first input tube and the second input tube are radiated with the light from the UV light source for a time of from 5 to 500 ms.

12. The method of preparing electronic ink microcapsules in accordance with claim 11, wherein a liquid in the output tube which are a mixture of liquids input from the first input tube and the second input tube are radiated with the light from the UV light source for a time of from 5 to 20 ms.

13. The method of preparing electronic ink microcapsules in accordance with claim 8, wherein the first input tube and the second input tube are connected to the output tube at the same site, thereby forming a manifold pathway port.

14. The method of preparing electronic ink microcapsules in accordance with claim 13, wherein the UV light source is arranged at the site of the manifold pathway port.

15. The method of preparing electronic ink microcapsules in accordance with claim 13, wherein the manifold pathway port is a circular pathway port having a diameter of 0.8 to 300 μm.

16. The method of preparing electronic ink microcapsules in accordance with claim 13, comprising at least two second input tubes located on the different sides of the first input tube.

17. The method of preparing electronic ink microcapsules in accordance with claim 13, wherein the first input tube and the second input tube are layered to form a bilayer tube structure.

* * * * *